United States Patent
Thiebaut et al.

(10) Patent No.: US 10,631,145 B1
(45) Date of Patent: Apr. 21, 2020

(54) DYNAMIC PROVISION OF APPLICATION RELATED SPONSORED DATA CONNECTIVITY

(71) Applicant: Alcatel Lucent, Nozay (FR)

(72) Inventors: Laurent Thiebaut, Antony (FR); Praveen Muley, Mountain View, CA (US)

(73) Assignee: Alcatel Lucent, Nozay (FR)

(*) Notice: Subject to any disclaimer, the term of this patent is extended or adjusted under 35 U.S.C. 154(b) by 0 days.

(21) Appl. No.: 16/737,475

(22) Filed: Jan. 8, 2020

Related U.S. Application Data

(63) Continuation of application No. 16/068,502, filed as application No. PCT/EP2017/050274 on Jan. 6, 2017, now abandoned.

(30) Foreign Application Priority Data

Jan. 8, 2016 (EP) .................................... 16305015

(51) Int. Cl.
*H04W 4/24* (2018.01)
*H04L 29/08* (2006.01)
(Continued)

(52) U.S. Cl.
CPC ........... *H04W 4/24* (2013.01); *H04L 12/1407* (2013.01); *H04L 12/1475* (2013.01);
(Continued)

(58) Field of Classification Search
CPC ......... H04W 4/24; H04W 12/08; H04W 4/50; H04W 12/06; H04W 24/02; H04W 48/02; H04W 48/04; H04W 52/0212; H04W 52/0264; H04W 76/10; H04W 8/18; H04W 4/60; H04W 28/16; H04W 40/24; H04W 28/0268; H04W 4/024; H04W 4/029; H04W 4/21; H04W 84/12; H04W 88/06; H04W 88/08; H04W 8/12; H04W 84/042;
(Continued)

(56) References Cited

U.S. PATENT DOCUMENTS

2012/0155380 A1    6/2012  Hodges
2012/0322505 A1   12/2012  Lodeweyckx
(Continued)

OTHER PUBLICATIONS

Qualcomm Incorporated et al: "Support for sponsored data connectivity: Impacts to current stage 2", 3GPP Draft; S2-102096-Policy-Sponsored-Impacts, 3rd Generation Partnership Project (3GPP), Mobile Competence Centre ; 650, Route Des Lucioles ; F-06921 Sophia-Antipolis Cedex ; France, vol. SA WG2, No. Kyoto, Japan; May 10, 2010-May 14, 2010, May 4, 2010.
(Continued)

*Primary Examiner* — Nimesh Patel
(74) *Attorney, Agent, or Firm* — Harness, Dickey & Pierce, P.L.C.

(57) ABSTRACT

A Policy Enforcement Function such as PCEF or TDF is configured to receive from a Policy Controller such as PCRF, over an interface such as Gx or Sd interface, a command related to a User Equipment UE, the command referring to a Sponsoring Context Identifier, Sponsoring Context ID, the Sponsoring Context ID serving as an identifier of a Sponsoring Context to be applied to application-related data traffic to be sponsored for the UE, the Sponsoring Context providing a list of data flows to be sponsored.

12 Claims, 5 Drawing Sheets

(51) Int. Cl.
*H04L 12/14* (2006.01)
*H04M 15/00* (2006.01)
*H04L 12/24* (2006.01)
*G06Q 30/02* (2012.01)

(52) U.S. Cl.
CPC ...... *H04L 12/1496* (2013.01); *H04L 41/0893* (2013.01); *H04L 67/02* (2013.01); *H04L 67/20* (2013.01); *H04L 67/2804* (2013.01); *H04L 67/2852* (2013.01); *H04M 15/09* (2013.01); *H04M 15/8083* (2013.01); *G06Q 30/0222* (2013.01); *H04M 2215/0192* (2013.01)

(58) Field of Classification Search
CPC .... H04W 88/16; H04L 67/2852; H04L 67/20; H04L 67/02; H04L 12/1475; H04L 12/1407; H04L 67/2804; H04L 41/0893; H04L 12/1496; H04L 47/14; H04L 47/20; H04L 41/5022; H04L 12/14; H04L 67/306; H04L 12/1439; H04L 12/1442; H04L 12/1446; H04L 12/4641; H04L 41/0806; H04L 41/0876; H04L 67/2819; H04L 12/1485; H04L 41/0803; H04L 63/102; H04M 15/09; H04M 2215/0192; H04M 15/8083; H04M 15/66; H04M 15/43; H04M 15/44; H04M 15/41; H04M 15/00; H04M 2215/0188; H04M 15/80; H04M 15/61; H04M 15/8214; H04M 15/8033; H04M 15/82; H04M 2215/0164; H04M 2215/66; H04M 15/56; H04M 15/58; H04M 17/208; H04M 2215/32; H04M 2215/52; H04M 15/70; H04M 15/88; G06Q 30/0222; G06Q 30/02; G06Q 30/0267; G06Q 30/0209; G06Q 30/0212; G06Q 30/0269; G06Q 30/0207; G06Q 30/0241; G06Q 30/00; G06Q 30/0261; G06Q 50/01; G06Q 30/0211; G06Q 30/0226
See application file for complete search history.

(56) References Cited

U.S. PATENT DOCUMENTS

| | | |
|---|---|---|
| 2014/0050137 A1 | 2/2014 | Alberth, Jr. et al. |
| 2014/0094138 A1 | 4/2014 | Saker et al. |
| 2014/0095690 A1 | 4/2014 | Saker et al. |
| 2014/0169172 A1 | 6/2014 | Hu et al. |
| 2015/0172899 A1 | 6/2015 | Sharma et al. |
| 2016/0210578 A1 | 7/2016 | Raleigh et al. |
| 2017/0178193 A1 | 6/2017 | Jagannath et al. |
| 2019/0037371 A1 | 1/2019 | Thiebaut et al. |

OTHER PUBLICATIONS

3rd Generation Partnership Project; Technical Specification Group Services and System Aspects; Study on Sponsored Data Connectivity Improvements (Release 14), Dec. 30, 2015 (Dec. 30, 2015), XP051071830.

Alcatel-Lucent et al: "New Solution: Usage of a sponsoring context Identifier", vol. SA WG2, No. Saint Kitts, KN; Jan. 25, 2016-Jan. 29, 2016, Jan. 17, 2016 (Jan. 17, 2016), XP051059732.

International Search Report PCT/ISA210 for International Application No. PCT/EP2017/050274 dated Feb. 17, 2017.

DYNAMIC PROVISION OF APPLICATION RELATED SPONSORED DATA CONNECTIVITY

CROSS-REFERENCE TO RELATED APPLICATIONS

This is a continuation of U.S. application Ser. No. 16/068,502 filed on Jul. 6, 2018, which is a national phase under 35 U.S.C. § 371 of PCT International Application No. PCT/EP2017/050274 which has an International filing date of Jan. 6, 2017, which claims priority to European Application No. 16305015.6 filed Jan. 8, 2016, the entire contents of each of which are hereby incorporated by reference.

BACKGROUND

1. Field

The present invention generally relates to communication networks and systems, in particular mobile communication networks and systems.

2. Description of Related Art

Descriptions of mobile networks and systems can be found in the literature, such as in particular in Technical Specifications published by standardization bodies such as for example 3GPP ($3^{rd}$ Generation Partnership Project).

In general, in a mobile communication system, a terminal (also called User Equipment UE) has access to various application services via a mobile network (PMN). In particular, a terminal has access to IP-based application services via an IP-Connectivity Access Network (IP-CAN). An example of IP-CAN is EPS (Evolved Packet System) network, specified in particular in 3GPP TS 23.401 and TS 23.402. An EPS network comprises EPC (Evolved Packet Core) that can be accessed by different Radio Access Networks (such as for example E-UTRAN).

Figure 1:
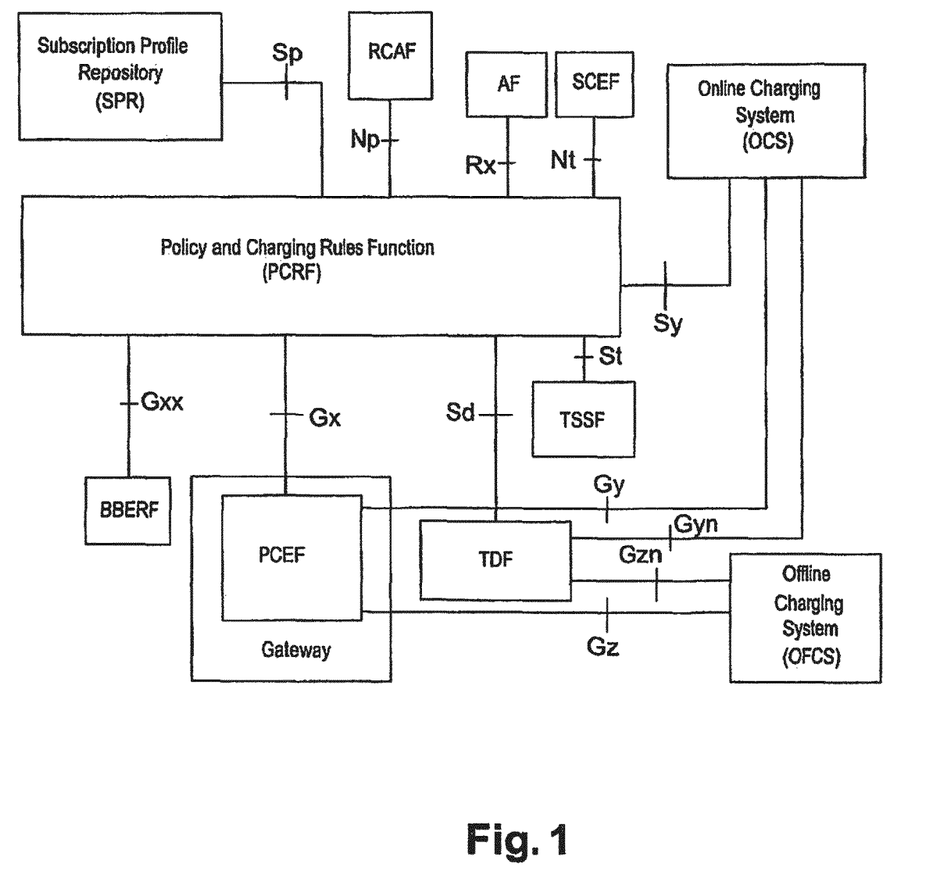
FIG. 1 is intended to recall an example of PCC architecture.

Policy and Charging Control (PCC) functionality is specified in particular in 3GPP TS 23.203. PCC functions include in particular: PCRF (Policy and Charging Rules Function), PCEF (Policy and Charging Enforcement Function), TDF (Traffic Detection Function), AF (Application Function), SPR (Subscriber Profile Repository). Interfaces within PCC architecture include in particular: Gx interface between PCRF and PCEF, Rx interface between AF and PCRF, Sd interface between PCRF and TDF. An example of PCC architecture is recalled in FIG. 1 taken from 3GPP TS 23.203.

Figure 2:
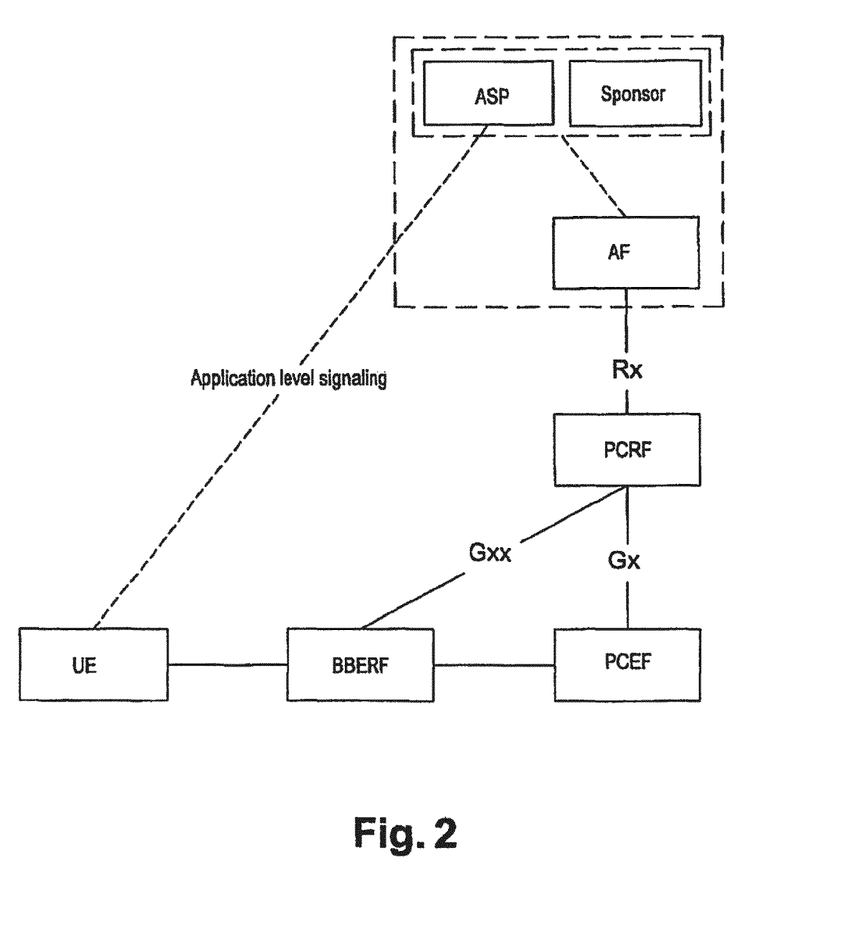
FIG. 2 is intended to recall an example of deployment for Sponsored Data Connectivity.

A feature called Sponsored Data Connectivity has been introduced in such systems. In particular, PCC usage for Sponsored Data Connectivity has been specified in 3GPP TS 23.203. As defined in particular in 3GPP TS 23.203, with sponsored data connectivity, the Sponsor has a business relationship with the operator and the Sponsor reimburses the operator for the user's data connectivity in order to allow the user access to an associated Application Service Provider's (ASP) services. An example of deployment for Sponsored Data Connectivity is recalled in FIG. 2 taken from 3GPP TS 23.203.

As recognized by the inventors and as will be described with more details later, there is a need to improve PCC usage for Sponsored Data Connectivity.

SUMMARY

Embodiments of the present invention in particular address such needs.

These and other objects are achieved, in one aspect, by a Policy Enforcement Function such as PCEF or TDF, configured to:
  receive from a Policy Controller such as PCRF, over an interface such as Gx or Sd interface, a command related to a User Equipment UE, said command referring to a Sponsoring Context Identifier, Sponsoring Context ID, said Sponsoring Context ID serving as an identifier of a Sponsoring Context to be applied to application-related data traffic to be sponsored for said UE, said Sponsoring Context providing a list of data flows to be sponsored.

These and other objects are achieved, in another aspect, by a Policy Controller, such as PCRF, configured to:
  send to a Policy Enforcement Function such as PCEF or TDF, over an interface such as Gx or Sd interface, a command related to a User Equipment UE, said command referring to a Sponsoring Context Identifier, Sponsoring Context ID, said Sponsoring Context ID serving as an identifier of a Sponsoring Context to be applied to application-related data traffic to be sponsored for said UE, said Sponsoring Context providing a list of data flows to be sponsored.

These and other objects are achieved, in another aspect, by an application-related entity such as AF interfacing with a Policy Controller such as PCRF, over an interface such as Rx interface, said application-related entity configured to:
  send to said Policy Controller a Sponsoring Context Identifier, Sponsoring Context ID, for a user, said Sponsoring Context ID serving as an identifier of a Sponsoring Context to be applied to application-related data traffic to be sponsored for said user, said Sponsoring Context providing a list of data flows to be sponsored.

These and other objects are achieved, in another aspect, by a Content Server, referred to as Sponsoring Context Repository, configured to:
  provide a Sponsoring Context to be applied to application-related data traffic to be sponsored for a User Equipment UE, upon reception of a request including a Sponsoring Context Identifier, Sponsoring Context ID, said Sponsoring Context ID serving as a pointer to said Sponsoring Context stored in said Sponsoring Context Repository, said Sponsoring Context providing a list of data flows to be sponsored.

These and other objects are achieved, in another aspect, by a OAM equipment of a mobile network, configured to:
  create in a content server, referred to as Sponsoring Context Repository, a Sponsoring Context document, identified by a Sponsoring Context Identifier, Sponsoring Context ID, said Sponsoring Context ID serving as information to build an identifier of a Sponsoring Context stored in said Sponsoring Context document.

These and other objects are achieved, in another aspect, by method for dynamic provision of application related sponsored data connectivity, said method comprising at least one step performed by at least one of a thus configured: Policy Enforcement Function such as PCEF or TDF, Policy Controller such as PCRF, application-related entity such as AF, content server referred to as Sponsoring Context Repository, OAM entity of a mobile network.

BRIEF DESCRIPTION OF THE DRAWINGS

Some embodiments of apparatus and/or methods in accordance with embodiments of the present invention are now described, by way of example only, and with reference to the accompanying drawings, in which.

ABBREVIATIONS

ADC Application Detection and Control
AF Application Function
APN Access Point Name
EPC Evolved Packet Core
EPS Evolved Packet System
HTTP HyperText Transfer Protocol
IP-CAN IP-Connectivity Access Network
MNO Mobile Network Operator
OAM Operation And Maintenance
PCC Policy and Charging Control
PCEF Policy and Charging Enforcement Function
PCRF Policy and Charging Rules Function
PGW PDN Gateway
SPR Subscription Profile Repository
TDF Traffic Detection Function
UE User Equipment
URL Uniform Resource Locator

DETAILED DESCRIPTION

Following description of various aspects and/or embodiments of the invention will be made by way of example for the case of the usage of the Sponsoring Context ID in the case of a PGW (PCEF). However, as understood by the skilled person, embodiments of the invention are not limited to such case.

3GPP as part of a Study on sponsored data connectivity improvements (FS-SDCI, whose WID is in document SP-150627) is working on improvements of the Sponsored data connectivity topic. This study especially addresses the following: "This key issue shall study:
1. How to support a dynamic provisioning of Sponsored data flow beyond layers 3 and 4 (e.g. URLs) from 3rd-party service providers to operator networks."

The Sponsored data connectivity feature has been specified as part of 3gpp Rel10 and is documented in 3GPP TS 23.203 (for example Annex N)

Note: in all this document the Third party may also correspond to an internal application of the operator.

One of the usages of sponsored data connectivity is the possibility for a Third party to sponsor advertisement. This kind of sponsoring would apply to a collection of users (possibly to all users).

The FS-SDCI study has thus following facets:
Allowing a 3$^{rd}$ party to define the sponsored data flows not only by specifying 5 T-uples[1] (as defined in current 3GPP TS 23.203) but by giving higher layer information such as a list of sponsored URL

[1] IP address and ports

Avoiding overloading the Rx and Gx interfaces by repeating the same list of sponsored URL over a Rx and a Gx Diameter session set-up for each user (as defined in current 3GPP TS 23.203, the list of sponsored data flows is explicitly provided over a Rx and a Gx Diameter session set-up for each user)

Provide flexibility for the Third part capability to change the list of sponsored flows Allow the operator to control the feature.

In some embodiments:
The QoS requirements sent by the policy controller (e.g. PCRF in EPC architecture defined in 3GPP TS 23.203) to the Policy enforcement Function (e.g. PCEF located in the PGW or in the BNG as defined in 3GPP TS 23.203 or TDF as defined in 3GPP TS 23.203) does not contain the list of flows to be sponsored but a pointer (actually an HTTP URL) to this list: the Sponsoring Context Id.

In some embodiments:
When the PCEF (PGW) or TDF receives a PCC/ADC rule referring to a Sponsoring context Id, it fetches the Sponsoring Context i.e. the list of flows that are sponsored (HTTP GET on the URL in the Sponsoring Context Id). As HTTP is used, caching techniques ensure that the PCEF/TDF does not need to fetch the list of flows that are sponsored for each user (Gx) session associated with an already known Sponsoring Context Id. The caching time may control how long the list of sponsored flows is valid In some embodiments:
The Sponsoring Context may correspond to a list of URL that are sponsored
Server name indication (SNI) as specified in IETF RFC 6066
SNI is an extension to the TLS protocol by which a client indicates which hostname it is attempting to connect to at the start of the TLS handshaking process. This allows a server to present multiple certificates on the same IP address and TCP port number and hence allows multiple secure (HTTPS) websites (or any other Service over TLS) to be served off the same IP address without requiring all those sites to use the same certificate
. . . .

In some embodiments:
The Sponsoring context Id may be dynamically passed from the 3rd party to the operator via Rx (in this case the 3rd party selects which UE will benefit from the sponsoring context) or statically configured in the PCRF (policy rules) (in that case the Sponsoring context Id applies to a collection of users, for example to the traffic of all users on a given APN or to the traffic of some user categories on an APN). Based on policy rules (and/or on information received on Rx) the PCRF decides whether to put a Sponsoring Context Id in the Gx(/Sd) commands sent to a PCEF(/TDF) about an UE and decides on the value of this Sponsoring Context Id.

In some embodiments:
The Content server (Sponsoring context Repository) that stores the Sponsoring Context (e.g. list of sponsored URL) belongs to the operator so is under control of the operator but the Third party may modify the list of sponsored flows as often as it desires based on its own business needs. This is to be controlled by business agreements between the operator and the Third party FIG. 5 depicts an example of signaling flow for the case of the usage of the Sponsoring Context Id in the case of a PGW (PCEF).

Figure 5:
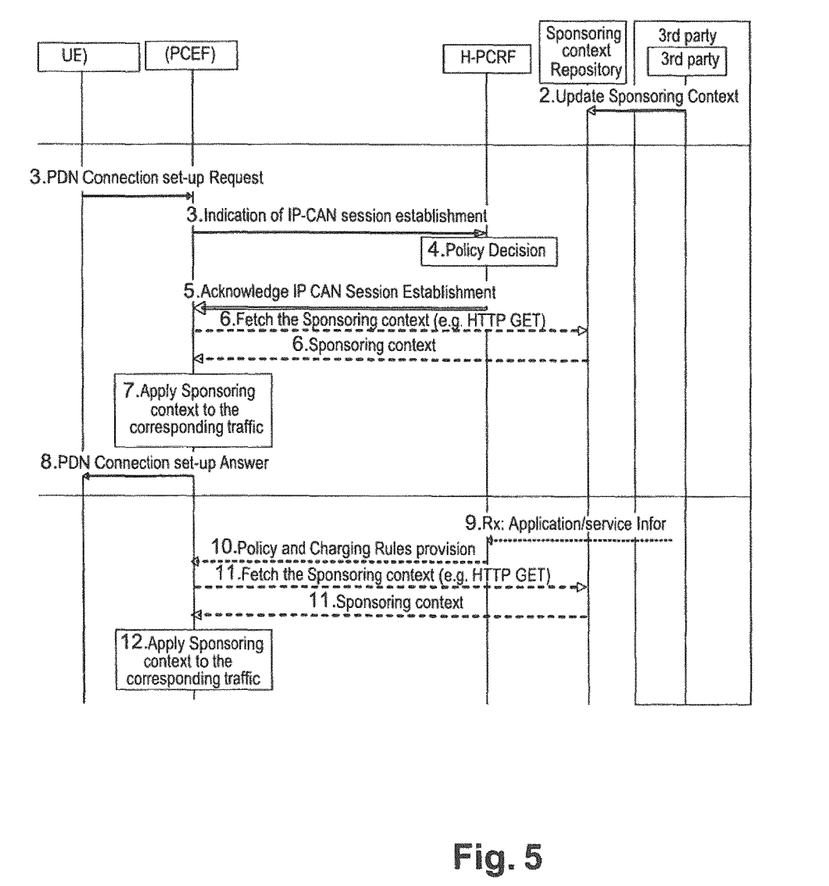
FIG. 5 is intended to illustrate an example of signaling flow, according to embodiments of the invention.

In FIG. 5, the dotted lines correspond to optional interactions.

Following operations may be distinguished:
Off line operations (operations not related with an user activity)

In some embodiments, part or all of following steps may be provided:

0. The Third party and the operator (MNO) negotiate a sponsoring agreement that is identified by a Sponsoring Context Id which is an unique identifier (e.g. URL) that refers to the Sponsoring Context i.e. to the actual list of Flows that the Third party is ready to sponsor (i.e. the Sponsoring context).

The Sponsoring Context Id refers to a content server that is hosted by the (OAM of the) operator. This allows the operator to control the list of flows that Third party may sponsor.

1. The operator
   a. Creates in the Sponsoring context Repository a Sponsoring Context document identified by the Sponsoring Context Id.
   b. May modify PCRF policies accordingly, e.g. may create policy rules that associate an APN, an user category, a subscription type, etc. . . . with one or more Sponsoring Context Id.
2. The Third party updates the list of flows it is ready to sponsor by e.g. adding/modifying/removing entries (URL, . . . ) in the Sponsoring Context stored in the Sponsoring context Repository. These operations are controlled by the operator OAM.

"on-line" operations (operations related with an user activity): actions at an IP-CAN Session Establishment In some embodiments, part or all of following steps may be provided:

3. An UE sets up a PDN connection as described in FIG. 3 corresponding to 3GPP TS 23.203 FIG. 7.2-1: "IP-CAN Session Establishment".

Figure 3:
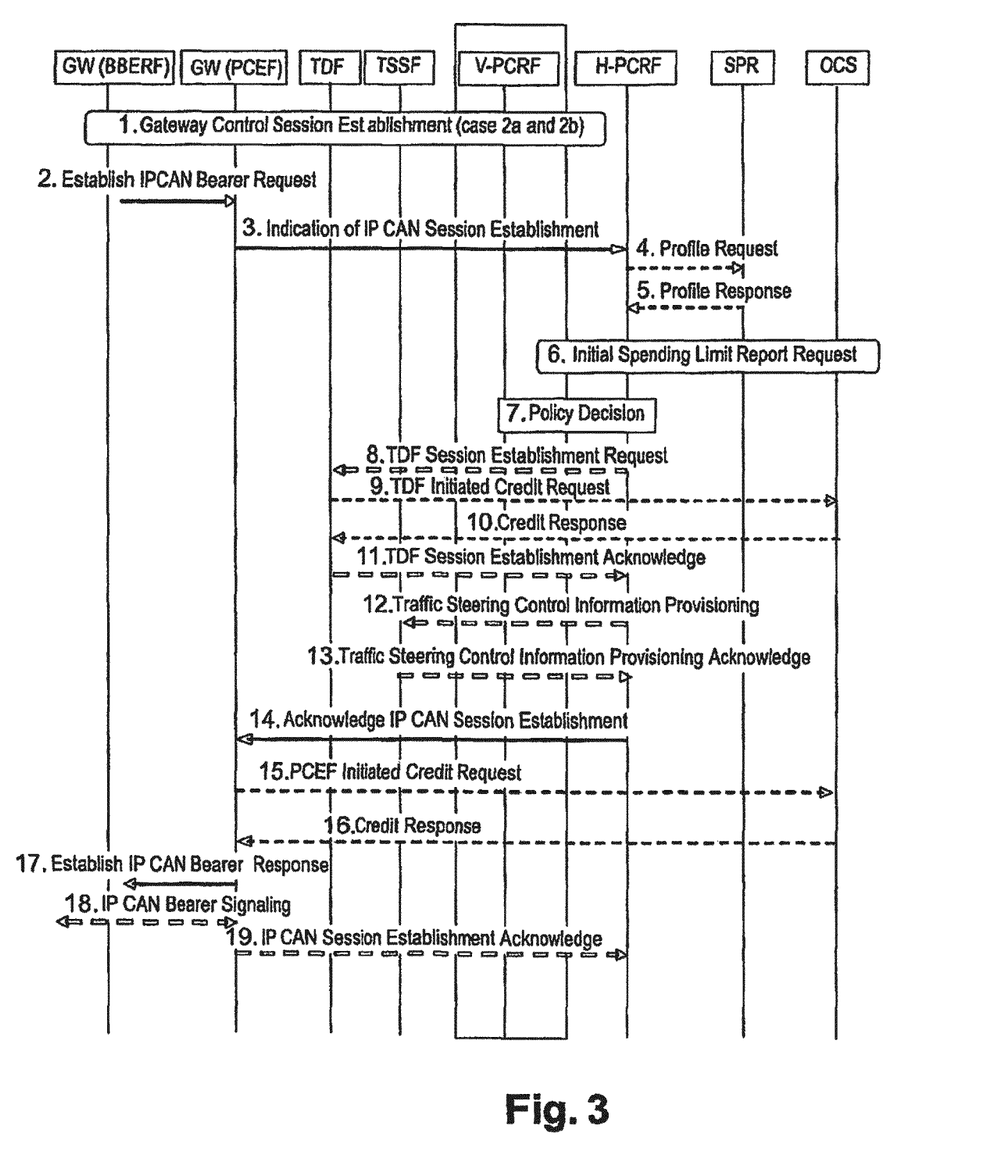
FIG. 3 is intended to recall a signaling flow for IP-CAN session establishment.

The PCEF/TDF request policies from the PCRF.

This is done via an indication of IP-CAN session establishment. Steps 2 to 5 of FIG. 3 take place without modification 4. (as part of step 7 of FIG. 3 in case of PCEF) Based on policy rules the PCRF decides whether to put a Sponsoring Context Id in the Gx(/Sd) commands to be sent to the PCEF(/TDF) about an UE and decides on the value of this Sponsoring Context Id. For example for this decision, the PCRF may use:

The APN of the target IPCAN session (in that case all UE are associated with the same sponsoring context, e.g. corresponding to ads).
   An user category received from the SPR (Subscriber Policy repository) as defined in 3GPP TS 23.203
   Or any combination of these parameters
   Or any other parameter 5. The PCRF provides the PCEF/TDF with PCC/ADC rules.
   In case of a PCEF as part of the PCRF acknowledgement of the IP-CAN session establishment (step 14 of FIG. 3) the PCRF may send PCC rules related with Sponsoring Context.

In case of a TDF as part of the TDF Session establishment request (step 8 of FIG. 3) the PCRF may send ADC rules related with Sponsoring Context The Sponsoring Context Id may be provided in a PCC/ADC rule instead of an application ID. This allows associating flows identified by the Sponsoring Context Id with existing PCC information such as Rating Groups (charging), QoS, Usage monitoring, etc. . . . .

6. When the PCEF or TDF receives a PCC/ADC rule referring to an unknown Sponsoring context Id (i.e. a Sponsoring context Id that it has not yet resolved), it fetches from the Sponsoring context Repository the Sponsoring Context i.e. the list of flows that are sponsored (HTTP GET on the URL in the Sponsoring Context Id).

As HTTP is used, caching techniques ensure that the PCEF/TDF does not need to fetch the list of flows that are sponsored for each user (Gx/Sd) session associated with an already known/resolved Sponsoring Context Id. The caching time may control how long the list of sponsored flows is valid.

Figure 4:
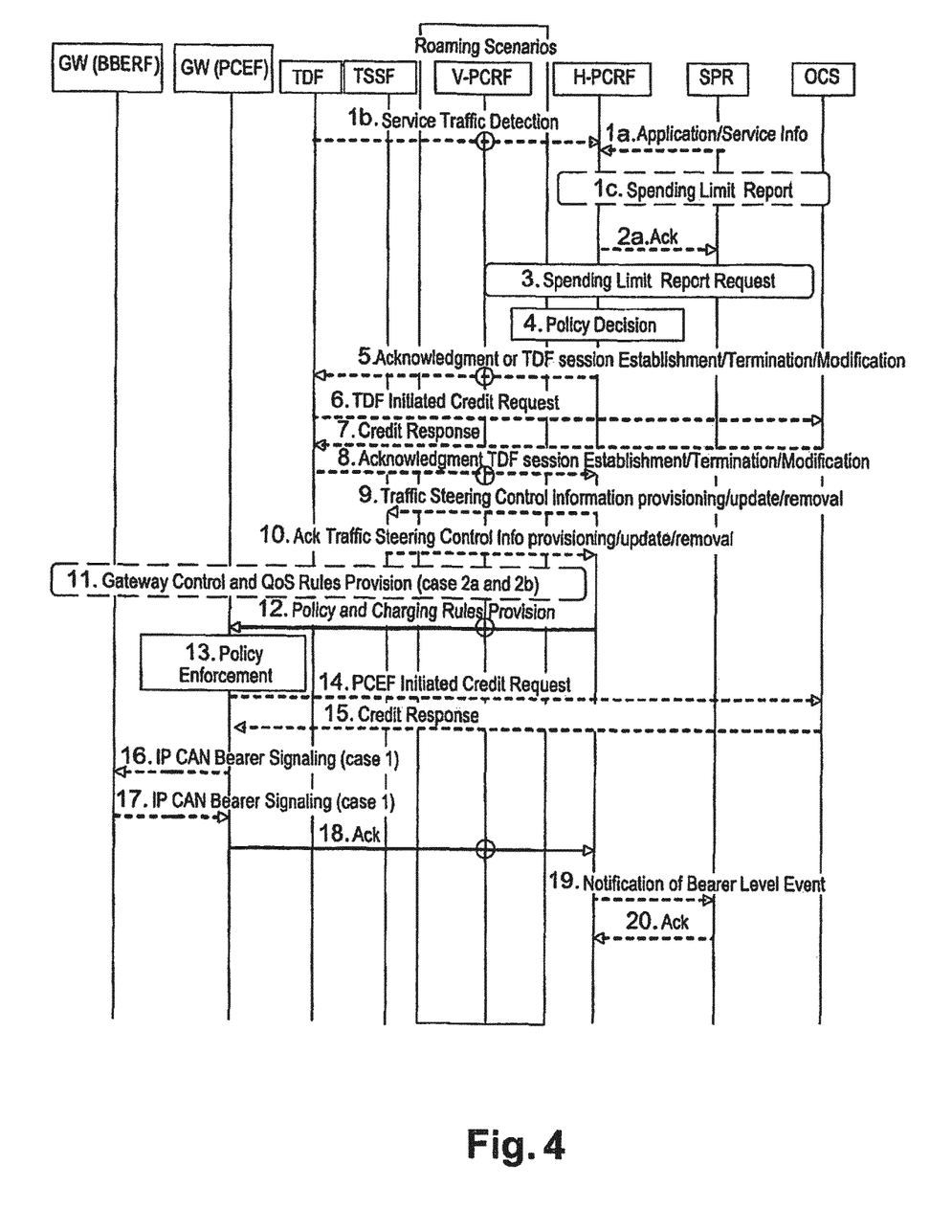
FIG. 4 is intended to recall a signaling flow for IP-CAN session modification (PCRF initiated)

7. The PCEF/TDF starts applying the PCC/ADC rule (charging, QoS control, usage monitoring, etc. . . . ) to the flows identified by the Sponsoring context Id (whose identifiers have been received in the Sponsoring Context).
8. The IP-CAN Session Establishment is further processed as in steps 15 to 19 of FIG. 3:

"on-line" operations (operations related with an user activity): actions at an Rx request from the Third party application In some embodiments, part or all of following steps may be provided:

9. The Third party application may decide to apply Sponsoring only for some users. In that case it may provide the sponsoring context Id to the PCRF over an Rx session (invoking step 1a of FIG. 4 corresponding to 3GPP TS 23.203 FIG. 7.5: IP-CAN Session Modification; PCRF initiated). Steps 2 to 11 of FIG. 4 may take place
10. The PCRF provides the PCEF/TDF with updated PCC/ADC rules The PCRF may send to the PCEF the Policy and Charging Rules Provision as in Step 12 of FIG. 4. As part of this step the PCRF may provide Sponsoring context Id as part of the PCC rule information sent over Gx. The PCRF may send to the TDF updated ADC rules as part of a Sd session modification (as in step 5 of FIG. 4). As part of this step the PCRF may provide Sponsoring context Id as part of the ADC rule information sent over Sd
11. The PCEF/TDF action is similar to that described at step 6
12. The PCEF/TDF action is similar to that described at step 7

Such mechanism in particular avoids the PCC chain (Rx, Gx/Sd) to have to pass long lists of URL that a Third party provider is ready to sponsor.

NOTE: The Sponsoring context Id passed over Gx/Sd does not need to correspond to the full URL that the PCEF/TDF uses in step 6/11 to fetch the sponsoring Context.: The Sponsoring Context ID may
either include a HTTP URL pointing to the Sponsoring Context
or include information to be used to build a HTTP URL pointing to the Sponsoring Context. For example, the sponsoring context Id is "OTT-x/sponsor-Ad" and the PCEF/TDF adds a fixed URL part like "https://www.operator.com/sponsor-context/" to build the final target "https://www.operator.com/sponsor-context/OTT-x/sponsor-Ad"

Various aspects of the invention include (though not being limited to) following aspects.

One aspect of the invention is a Policy Enforcement Function such as PCEF or TDF Various embodiments may be provided, including (though not being limited to) following embodiments, which may be taken alone or in combination, according to various combinations.

In an embodiment, said Policy Enforcement Function is configured to:
receive from a Policy Controller such as PCRF, over an interface such as Gx or Sd interface, a command related to a User Equipment UE, said command referring to a Sponsoring Context Identifier, Sponsoring Context ID, said Sponsoring Context ID serving as an identifier of a Sponsoring Context to be applied to application-related data traffic to be sponsored for said UE, said Sponsoring Context providing a list of data flows to be sponsored.

In an embodiment, said Policy Enforcement Function is configured to:
fetch said Sponsoring Context from a content server referred to as Sponsoring Context Repository, using said Sponsoring Context ID as a pointer to said Sponsoring Context stored in said Sponsoring Context Repository.

In an embodiment, said Policy Enforcement Function is configured to:
fetch said Sponsoring Context from a content server referred to as Sponsoring Context Repository by sending to said content server a HTTP request, such as HTTP GET, on an HTTP URL corresponding to the content of said Sponsoring Context ID or built using the content of said Sponsoring Context ID.

In an embodiment, said Policy Enforcement Function is configured to:
receive said Sponsoring Context ID with an associated policy rule such as PCC or ADC rule.

In an embodiment, said Policy Enforcement Function is configured to:
receive said Sponsoring Context ID in a command acknowledging establishment of an IP-CAN session establishment for said UE, such as Acknowledge IP-CAN Session Establishment.

Another aspect of the invention is a Policy Controller, such as PCRF.

Various embodiments may be provided, including (though not being limited to) following embodiments, which may be taken alone or in combination, according to various combinations.

In an embodiment, said Policy Controller is configured to:
send to a Policy Enforcement Function such as PCEF or TDF, over an interface such as Gx or Sd interface, a command related to a User Equipment UE, said command referring to a Sponsoring Context Identifier, Sponsoring Context ID, said Sponsoring Context ID serving as an identifier of a Sponsoring Context to be applied to application-related data traffic to be sponsored for said UE, said Sponsoring Context providing a list of data flows to be sponsored.

In an embodiment, said Policy Controller is configured to:
associate said Sponsoring Context ID with said UE, based on at least one, or a combination of, parameters related to said UE including:
An APN of an IP-CAN session,
A user category,
A subscription type.

In an embodiment, said Policy Controller is configured to:
store policy rules associating said APN and/or user category and/or subscription Type with one or more Sponsoring Context ID.

In an embodiment, said Policy Controller is configured to:
send said Sponsoring Context ID to said Policy Enforcement Function in a command acknowledging establishment of an IP-CAN session for said UE, such as Acknowledge IP-CAN Session Establishment.

In an embodiment, said Policy Controller is configured to:
receive said Sponsoring Context ID from an application-related entity such as an AF, over an interface such as a Rx interface.

In an embodiment, said Policy Controller is configured to:
send said Sponsoring Context ID to said Policy Enforcement Function in a command such as Policy and Charging Rules Provision.

In an embodiment, said Policy Controller is configured to:
send said Sponsoring Context ID to said Policy Enforcement Function in a command such as Sd session modification.

In an embodiment, said Policy Controller is configured to:
send said Sponsoring Context ID to said Policy Enforcement Function with an associated policy rule such as PCC or ADC rule.

In an embodiment:
said Sponsoring Context ID includes a HTTP URL pointing to said Sponsoring Context or includes information to be used to build a HTTP URL pointing to said Sponsoring Context.

Another aspect of the invention is an application-related entity such as AF interfacing with a Policy Controller such as PCRF, over an interface such as Rx interface.

Various embodiments may be provided, including (though not being limited to) following embodiments, which may be taken alone or in combination, according to various combinations.

In an embodiment, said application-related entity is configured to:
send to said Policy Controller a Sponsoring Context Identifier, Sponsoring Context ID, for a user, said Sponsoring Context ID serving as an identifier of a Sponsoring Context to be applied to application-related data traffic to be sponsored for said user, said Sponsoring Context providing a list of data flows to be sponsored.

In an embodiment, said application-related entity is configured to:
invoke a session such as Rx session over said interface such as Rx interface, for sending said Sponsoring Context ID to said Policy Controller.

In an embodiment:
said Sponsoring Context ID includes a HTTP URL pointing to said Sponsoring Context or includes information to be used to build a HTTP URL pointing to said Sponsoring Context.

In an embodiment, said application-related entity is configured to:
update the content of the Sponsoring Context under control of the OAM of the operator.

Another aspect of the invention is a Content Server, referred to as Sponsoring Context Repository.

Various embodiments may be provided, including (though not being limited to) following embodiments, which may be taken alone or in combination, according to various combinations.

In an embodiment, said Content Server is configured to:
provide a Sponsoring Context to be applied to application-related data traffic to be sponsored for a User Equipment UE, upon reception of a request including a Sponsoring Context Identifier, Sponsoring Context ID, said Sponsoring Context ID serving as a pointer to said Sponsoring Context stored in said Sponsoring Context Repository, said Sponsoring Context providing a list of data flows to be sponsored.

In an embodiment, said Content Server is configured to:
receive said request from a Policy Enforcement Function such as PCEF or TDF.

In an embodiment, said Content Server is configured to:
said Sponsoring Context ID including information to build a HTTP URL pointing to said Sponsoring Context, provide said Sponsoring Context upon reception of a HTTP request, such as HTTP GET, on said HTTP URL.

Another aspect of the invention is a OAM equipment of a mobile network.

Various embodiments may be provided, including (though not being limited to) following embodiment.

In an embodiment, said OAM equipment is configured to:
create in a content server, referred to as Sponsoring Context Repository, a Sponsoring Context document, identified by a Sponsoring Context Identifier, Sponsoring Context ID, said Sponsoring Context ID serving as information to build an identifier of a Sponsoring Context stored in said Sponsoring Context document.

Another aspect of the invention is a method for dynamic provision of application related sponsored data connectivity, said method comprising at least one step performed by at least one of a thus configured: Policy Enforcement Function such as PCEF or TDF, Policy Controller such as PCRF, application-related entity such as AF, content server referred to as Sponsoring Context Repository, OAM entity of a mobile network.

Other possible embodiments than described above are also possible, e.g. where the Policy Controller is another entity than the PCRF of 4G-EPC such as the function of the 5G Core Network determining policies for the network or where the Policy Enforcement Function may be any entity enforcing policies to user plane traffic such as the PDN-GW-U and TDF-U defined in 3GPP TR 23.714 or the entity enforcing policies to user plane traffic in a 5G Core Network.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:
at least one processor; and
at least one memory including computer program code,
the at least one memory and the computer program code configured to, with the at least one processor, cause the apparatus at least to
provide policy enforcement functions in a mobile communication network,
receive a command containing a pointer to a list of sponsored data flows defined by a third party service provider,
fetch said list of sponsored data flows from a repository storing said list, using said pointer to said list, and
provide said policy enforcement functions based on said command and on said list of sponsored data flows.

2. The apparatus according to claim 1, wherein the at least one memory and the computer program code are configured to, with the at least one processor, cause the apparatus at least to:
fetch said list by sending to said repository a hypertext transfer protocol request on a hypertext transfer protocol uniform resource locator pointing to said list.

3. The apparatus according to claim 1, wherein a caching time controls how long said list is valid.

4. The apparatus according to claim 1, wherein the at least one memory and the computer program code are configured to, with the at least one processor, cause the apparatus at least to:
fetch said list if said list has not already been fetched or if a caching time controlling how long said list is valid has expired.

5. The apparatus according to claim 1, wherein said apparatus comprises a policy and charging enforcement function and said command comprises a policy and charging control rule.

6. The apparatus according to claim 1, wherein said apparatus comprises a traffic detection function and said command comprises an application detection and control rule.

7. A method comprising:
providing policy enforcement functions in a mobile communication network,
receiving a command containing a pointer to a list of sponsored data flows defined by a third party service provider,
fetching said list of sponsored data flows from a repository storing said list, using said pointer to said list, and
providing said policy enforcement functions based on said command and on said list of sponsored data flows.

8. The method according to claim 7, wherein the fetching fetches said list by sending to said repository a hypertext transfer protocol request on a hypertext transfer protocol uniform resource locator, pointing to said list.

9. The method according to claim 7, wherein a caching time controls how long said list is valid.

10. The method according to claim 7, comprising:
fetching said list if said list has not already been fetched or if a caching time controlling how long said list is valid has expired.

11. The method according to claim 7, wherein said policy enforcement functions comprise policy and charging enforcement functions and said command comprises a policy and charging control rule.

12. The method according to claim 7, wherein said policy enforcement functions comprise traffic detection functions and said command comprises an application detection and control rule.

* * * * *